US008679403B2

(12) United States Patent
Tan et al.

(10) Patent No.: US 8,679,403 B2
(45) Date of Patent: Mar. 25, 2014

(54) METHOD AND USE OF PROVIDING PHOTOCATALYTIC ACTIVITY

(75) Inventors: Ooi Kiang Tan, Singapore (SG); Ying Hu, Singapore (SG)

(73) Assignee: Nanyang Technological University, Singapore (SG)

( * ) Notice: Subject to any disclaimer, the term of this patent is extended or adjusted under 35 U.S.C. 154(b) by 490 days.

(21) Appl. No.: 12/922,668

(22) PCT Filed: Dec. 3, 2008

(86) PCT No.: PCT/SG2008/000463
§ 371 (c)(1),
(2), (4) Date: Jan. 19, 2011

(87) PCT Pub. No.: WO2009/113963
PCT Pub. Date: Sep. 17, 2009

(65) Prior Publication Data
US 2011/0104002 A1   May 5, 2011

Related U.S. Application Data (60) Provisional application No. 61/036,647, filed on Mar. 14, 2008.

(51) Int. Cl.
*A61L 2/00* (2006.01)
*A62B 7/08* (2006.01)

(52) U.S. Cl.
USPC ............... 422/22; 422/24; 422/120; 422/121; 422/122

(58) Field of Classification Search
USPC .............................. 422/22, 24, 120, 121, 122
See application file for complete search history.

(56) References Cited

U.S. PATENT DOCUMENTS

| 2003/0148881 A1 | 8/2003 | Matsuo et al. | 502/304 |
| 2004/0127354 A1* | 7/2004 | Andrews | 502/349 |
| 2007/0087187 A1 | 4/2007 | Lu et al. | 428/323 |
| 2007/0181508 A1 | 8/2007 | Gui et al. | 210/748 |

FOREIGN PATENT DOCUMENTS

| JP | 2003-33662 | 2/2003 |
| JP | 2005-103496 | 4/2005 |
| WO | 2008/079865 | 7/2008 |
| WO | 2008/127200 | 10/2008 |

OTHER PUBLICATIONS

Subramanian et al., Synthesis and UV-Visible-Light Photoactivity of Noble-Metal-SrTiO3 Composites, 2006, Ind. Eng. Chem. Res., vol. 45, No. 7, 2187-2193.*
Voigts et al., Synthesis and characterization of strontium titanate nanoparticles as potential high temperature oxygen sensor material, Jan. 1, 2006, Journal of Nanomaterials.*
Arentzen et al., "High Efficiency Ball Mill Grinding," *Engineering and Mining Journal*, 209(3):62-68, 2008.
Bae et al., "Dopant dependent band gap tailoring of hydrothermally prepared cubic $SrTi_xMi_{1-x}O_3$ (M=Ru, Rh, Ir, Pt, Pd) nanoparticles as visible light photocatalysts," *Applied Physics Letters*, 92:104107-104107-3, 2008.
Bessekhouad et al., "Photocatalytic activity of $Cu_2O/TiO_2$, $Bi_2O_3/TiO_2$ and $ZnMn_2O_4/TiO_2$ heterojunctions," *Catalysis Today*, 101:315-321, 2005.
Brito et al., "$SrFe_{12}O_{19}$ prepared by the proteic sol-gel process," *Physica B*, 384:91-93, 2006.
Brixner et al., "Preparation and Properties of the $SrTi_{1-x}Fe_xO_{3-x/2}\varnothing_{x/2}$ System," *Mat. Res. Bull.*, 3:299-308, 1968.
Buonsanti et al., "Nonhydrolytic Synthesis of High-Quality Anisotropically Shaped Brookite $TiO_2$ Nanocrystals," *J. Am. Chem. Soc*, 130:11223-11233, 2008.
Cheung et al., "N incorporation and electronic structure in N-doped $TiO_2(110)$ rutile," *Surface Science*, 601:1754-1762, 2007.
Costa et al., "Effects of Humidity on the Electrical Behaviour of $Sr_{0.97}Ti_{0.97}Fe_{0.03}O_{3-\delta}$," *Journal of the European Ceramic Society*, 19:769-772, 1999.
Frenzer et al., "Amorphous Porous Mixed Oxides: Sol-Gel Ways to a Highly Versatile Class of Materials and Catalysts," *Annu. Rev. Mater. Res.*, 36:281-331, 2006.
Fujishima et al., "Electrochemical Photolysis of Water at a Semiconductor Electrode," *Nature*, 238:37-38, 1972.
Fukuda et al., "Temperature Dependence of Dielectric Absorption Current of $SrTiO_3$ Thin-Film Capacitor," *Jpn. J. Appl. Phys.*, 34(Part 2, No. 10A):L1291-L1292, 1995.
Hu et al., "Fabrication and Characterization of Nano-Sized $SrTiO_3$-Based Oxygen Sensor for Near Room-Temperature Operation," *IEEE Sensors Journal*, 5(5):825-832, 2005.
Ke et al., "Preparation and photocatalytic activity of $WO_3/TiO_2$ nanocomposite particles," *Materials Letters*, 62:447-450, 2008.
Kudo, "Photocatalysis and solar hydrogen production," *Pure Appl. Chem.*, 79(11):1917-1927, 2007.
Kumar et al., "Photodegradation of ethylene using visible light responsive surfaces prepared from titania nanoparticle slurries," *Applied Catalysis B: Environmental*, 57:93-107, 2005.
Liu et al., "Nanoporous composite of carbon nanosheets and functional titania nanoparticles formed by reassembling of exfoliated graphite oxides with colloidal titania," *Material Letters*, 63:260-262, 2009.
Lotnyk et al., "Topotaxial formation of titanium-rich barium titanates during solid state reactions on (110) $TiO_2$ (rutile) and (001) $BaTiO_3$ single crystals," *Solid State Sciences*, 10:702-708, 2008.
Moos et al., "Materials for temperature independent resistive oxygen sensors for combustion exhaust gas control," *Sensors and Actuators B*, 67:178-183, 2000.
Neri et al., "Resistive λ-sensors based on ball milled Fe-doped $SrTiO_3$ nanopowders obtained by self-propagating high-temperature synthesis (SHS)," *Sensors and Actuators B*, 126:258-265, 2007.
Oka et al., "Efficacy of Titanium Dioxide Photocatalyst for Inhibition of Bacterial Colonization on Percutaneous Implants," *Journal of Biomedical Materials Research Part B: Applied Biomaterials*: 530-540, 2008.
Okumura et al., "Synthesis of $SrTiO_3$ nanoparticle/polymer composite film using direct current field," *J. Mater. Res.*, 23(1):127-132, 2008.
Osterwalder et al., "Growth of Cr-doped $TiO_2$ films in the rutile and anatase structures by oxygen plasma assisted molecular beam epitaxy," *Thin Solid Films*, 484:289-298, 2005.
Peral et al., "Heterogeneous Photocatalysis for Purification, Decontamination and Deodorization of Air," *J. Chem. Technol. Biotechnol.*, 70:117-140, 1997.

(Continued)

*Primary Examiner* — Regina M Yoo
(74) *Attorney, Agent, or Firm* — Seed IP Law Group PLLC (57) ABSTRACT

Disclosed is a method of providing photocatalytic activity. Nanoparticulate matter comprising a strontium titanate ferrite of the general formula SrTi1-xFexO3- is provided, in which x is any value from 0 to 1. The nanoparticulate matter is exposed to electromagnetic radiation of a wavelength from about 380 nm to about 800 nm.

12 Claims, 6 Drawing Sheets

(56) References Cited

OTHER PUBLICATIONS

Rothschild et al., "Electronic Structure, Defect Chemistry, and Transport Properties of $SrTi_{1-x}Fe_xO_{3-y}$ Solid Solutions," *Chem. Mater.*, 18:3651-3659, 2006.

Sahner et al., "Hydrocarbon sensing with thick and thin film p-type conducting perovskite materials," *Sensors and Actuators B*, 108:102-112, 2005.

Sahner et al., "Electrodeposited and Sol-gel Precipitated *p*-type $SrTi_{1-x}Fe_xO_{3-\delta}$ Semiconductors for Gas Sensing," *Sensors*, 7:1871-1886, 2007.

Somani et al., "Synthesis and characterization of nanocrystalline Barium Strontium Titanate powder via sol-gel processing," *J. Electroceram.*, 18:57-65, 2007.

Steinsvik et al., "Hydrogen ion conduction in iron-substituted strontium titanate, $SrTi_{1-x}Fe_{x/2}$ ($0 \leq x \leq 0.8$)," *Solid State Ionics*, 143:103-116, 2001.

Wang et al., "Lanthanum and nitrogen co-doped $SrTiO_3$ powders as visible light sensitive photocatalyst," *Journal of the European Ceramic Society*, 25:3207-3212, 2005.

Wang et al., "Preparation and gas-sensing properties of perovskite-type $SrFeO_3$ oxide," *Materials Letters*, 49:361-364, 2001.

Xu et al., "Fabrication of anatase-type $TiO_2$ films by reactive pulsed laser deposition for photocatalyst application," *Journal of Materials Processing Technology*, 202:301-306, 2008.

Yamasita et al., "Recent progress of visible-light-driven heterogeneous photocatalysts for overall water splitting," *Solid State Ionics*, 172:591-595, 2004.

Yin et al., "Preparation of nitrogen-doped titania with high visible light induced photocatalytic activity by mechanochemical reaction of titania and hexamethylenetetramine," *J. Mater. Chem.*, 13:2996-3001, 2003.

Zhang et al., "Microstructures and Optical Properties of Strontium Titanate Nanocrystals Prepared by a Stearic-Acid Gel Process," *Modern Physics Letters B*, 14(19):709-716, 2000.

Zhou et al., "Photocatalytic decomposition of formic acid under visible light irradiation over V-ion-implanted $TiO_2$ thin film photocatalysts prepared on quartz substrate by ionized cluster beam (ICB) deposition method," *Catalysis Letters*, 106(Nos. 1-2):67-70, 2006.

\* cited by examiner

METHOD AND USE OF PROVIDING PHOTOCATALYTIC ACTIVITY

CROSS-REFERENCE TO RELATED APPLICATIONS

The present application is a national stage entry according to 35 U.S.C. §371 of PCT application No.: PCT/SG2008/000463 filed on Dec. 03, 2008. This application makes reference to and claims the benefit of priority of an application for a "Method and Use of Providing Photocatalytic Activity" filed on Mar. 14, 2008 with the United States Patent and Trademark Office, and there duly assigned Ser. No. 61/036,647. The contents of said application filed on Mar. 14, 2008 is incorporated herein by reference for all purposes, including an incorporation of any element or part of the description, claims or drawings not contained herein and referred to in Rule 20.5(a) of the PCT, pursuant to Rule 4.18 of the PCT.

FIELD OF THE INVENTION

The present invention provides a method of and a use for providing photocatalytic activity. The methods and uses may be applied to the prevention of occurrence and/or the destruction of a microorganism, a virus, a fungus, a mold, an algae, an organic compound or an inorganic compound. They may, for instance, find applications in air purification, disinfection of surfaces or in the formation of an antimicrobial, antifungal, and antifouling coating. The method/use includes providing nanoparticulate matter that includes a strontium titanate ferrite (also termed strontium titanium iron oxide) of the general formula $SrTi_{1-x}Fe_xO_{3-\delta}$, with x being any value in the range from 0 to 1.

BACKGROUND OF THE INVENTION

Figure 1:
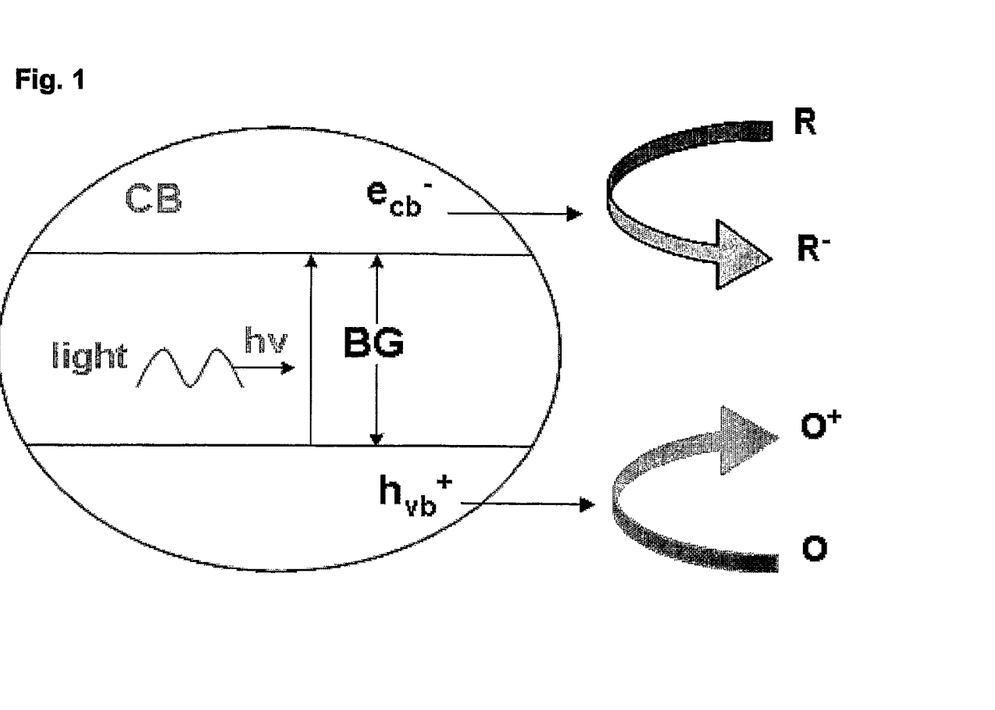
FIG. 1 depicts the photocatalytic reaction of a semiconductor under matching irradiation light. R=reduction; O=oxidation, photons energy (hv), valence band (VB), conduction band (CB), bandgaps (BG), electrons ($e^-$) and holes ($h^+$).

Since Fujishima & Honda reported the photosensitized decomposition of water into $H_2$ and $O_2$ (*Nature* (1972) 238, 37-38), much research has been undertaken on the application of photocatalytic semiconducting material in functions as far-ranging as air de-odorization, air purification, anti-fogging materials, water treatment, anti-bacterial materials, self-cleaning materials, and biomedical materials. The basic principle of the progress of a photocatalytic process can be described as follows. Upon exposing semiconducting materials to matching irradiation light (such as UV, visible or solar light), excitation by photons from the source causes electrons in the valence band of the exposed materials to be promoted into the conduction band over the band-gap. As a result electron (in the conduction band)-hole (in the valence band) pairs are formed. After migration to the solid's surface, these electron-hole pairs may undergo electron-transfer processes with adsorbates of suitable redox potentials to decompose organic compounds including the deactivation of bacteria or degradation of organic dyes (FIG. 1).

Figure 2:
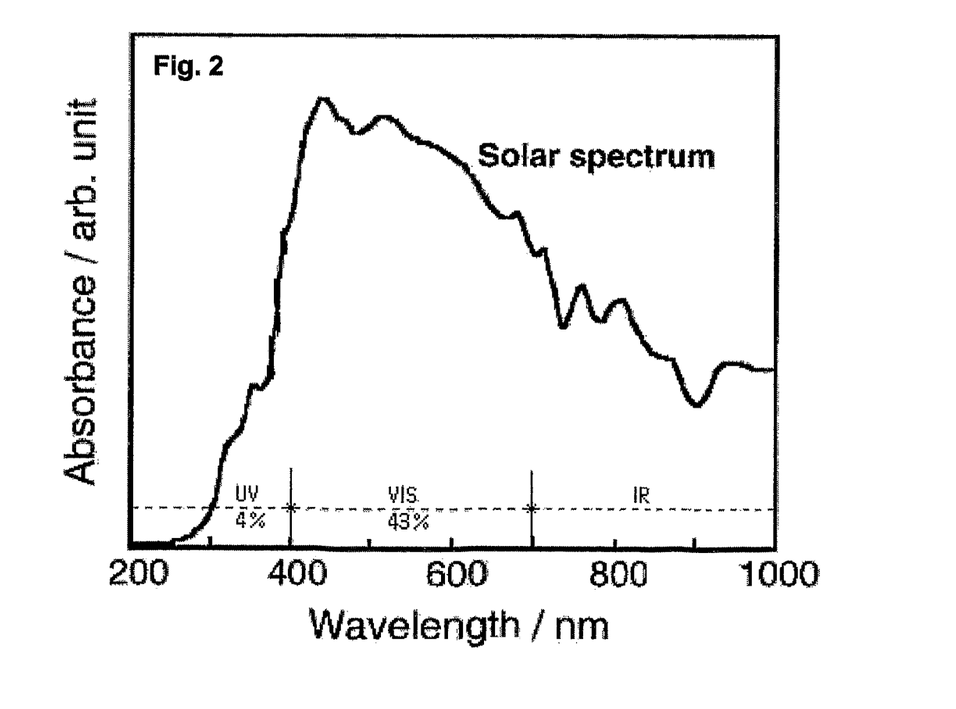
FIG. 2 illustrates the solar spectrum from 200-1000 nm.

The conventional photocatalyst $TiO_2$ has a 3.2 eV wide bandgap. Thus it can be excited under wavelengths of $\lambda<388$ nm, i.e. under UV irradiation. These wavelengths however constitute only ≤4% of the solar energy (FIG. 2). Hence, its poor photo-catalytic efficiency under visible light has limited its use in indoor and outdoor applications involving the decomposition of organic compounds. There is therefore a need for photocatalytic matter that is capable of utilizing the visible light spectrum, i.e. wavelengths in the range from about 400-700 nm that constitute 43% of the solar energy.

For this purpose many researchers have paid particular attention to search or synthesize visible-light-driven photo-catalysts (the material bandgaps between 3.1-1.8 eV for absorbing visible light (Shu, Y., et al., *J. Mater Chem.* (2003) 13, 2996-3001). To date, the development of photo-catalytic materials under visible irradiation can be classified into 3 basic research directions:

Firstly, the conventional photocatalyst $TiO_2$ series, doped dopants or coupled with narrower band-gap semiconductors, can absorb a small part of the visible light (Kumar, S., et al., *Applied Catalysis B: Environmental* (2005) 57, 93-107; Bessekhouad, Y., et al., *Catalysis Today* (2005) 101, 315-321). $TiO_2$ doped with Cr, V or N produces some red shift in the energy band resulting in the absorbance of a small part of the light in the visible range. $TiO_2$ coupled with the narrower band-gap semiconductor materials (as sensitizers), such as the $Cu_2O/TiO_2$, $Bi_2O_3/TiO_2$, and $ZnMn_2O_4/TiO_2$ heterojunctions, can absorb some single visible light frequency.

Secondly, narrow bandgap materials can directly absorb some single visible light frequency, including some toxic binary-compounds (e.g. CdS, ZnS, CdSe, ZnSe, CdTe), and poly-compound $MTaO_2N$ ($Ta^{5+}$-based (oxy) nitrides), $Bi_2MNbO_7$, $BiMO_4$, $InMO_4$, (M represents a metal) etc. (Peral, J., et al., *J. Chem. Technol. Biotechnol.* (1997) 70, 117-140; Yamasita D., et al., *Solid State Ionics* (2004) 172, 591-595).

Thirdly, doping dopants in poly-compound with wide band-gap (above 3.1 eV) can absorb a small part of the visible light due to some red shift in the energy band (Yamasita D., et al., 2004, supra). For example, $SrTiO_3$ (3.2 eV band-gap) doped La, N, F, Cr or Ta can produce a red shift that allows part visible light absorption (Wang, J., *Journal of the European Ceramic Society* (2005) 25, 3207-3212).

All these reported photo-catalysts can only utilize a part of the visible-light range due to either a limited red shift of energy band or single visible light frequency dependence for the hetero junction materials. Hence they have very poor photo-catalytic efficiency under visible light and can only be used for limited applications such as deodorizers, anti-fogging materials and self-cleaning materials. There thus remains the need for a photocatalyst that can absorb a wider range of the visible light spectrum, ideally the whole visible light range, i.e. the wavelength range from about 400 to about 700 nm. It is furthermore desirable for anti-bacterial applications under visible light, that the photo-catalytic reaction rate for the respective materials be faster than the growth rate of the bacteria, in order for the material to prevent bacterial growth.

Various embodiments provide a method of providing photocatalytic activity with properties that overcome at least some of the above discussed disadvantages.

SUMMARY OF THE INVENTION

According to a first aspect, the invention provides a method of providing photo-catalytic activity. The method includes providing nanoparticulate matter. The nanoparticulate matter includes a strontium titanate ferrite. The strontium titanate ferrite is of the general formula $SrTi_{1-x}Fe_xO_{3-\delta}$. In this formula x is any value from 0 to 1. The method further includes allowing exposure to electromagnetic radiation of a wavelength from about 380 nm to about 800 nm.

According to a second aspect, the invention relates to the use of nanoparticulate matter as a photocatalyst having photocalatyic activity when exposed to electromagnetic radiation of a wavelength from about 380 nm to about 800 nm. The nanoparticulate matter includes a strontium titanate ferrite of the general formula $SrTi_{1-x}Fe_xO_{3-\delta}$. In this formula x is any value from 0 to 1.

The present inventors have successfully synthesized a nano-structured metal oxide semiconducting composite STFx series suitable for photocatalytic-based anti-bacterial activity under the whole visible light range for both indoor and outdoor applications. The synthesized materials can not only absorb 43% of sunlight (FIG. 2) in outdoor environments, but also the normal light under artificial light (e.g. fluorescent bulbs). They do not require UV light for electron-hole pair formation and hence are safe, clean, convenient and economical for a wide range of applications in common places such as hospital, offices, canteens, homes and toilets.

The conventional STFx ($SrTi_{1-x}Fe_xO_{3-\delta}$) (x=0 to 1) series have so far been mainly applied in gas sensors (oxygen, hydrocarbon, $C_2H_5OH$) (Moos, R., et al., *Sensors and Actuators B* (2000) 67, 178-183; Sahner, K, et al., *Sensors and Actuators B* (2005) 108, 102-112; Wang, Y., et al., *Materials Letters* (2001) 49, 361-364), humidity sensors (Costa, M. E. V., et al., *Journal of the European Ceramic Society* (1999) 19, 769-772), and hydrogen ion conduction (Steinsvik, S., et al., *Solid State Ionics* (2001) 143 103-116). $SrTiO_3$ is also a proposed candidate for the dielectrics of dynamic random access memory (DRAM) (Fukuda, Y., et al., *Jpn. J. Appl. Phys.* (1995) 34, L1291-L1292). For the photocatalytic application under visible irradiation, STFx ($SrTi_{1-x}Fe_xO_{3-\delta}$) (x=0 to 1) has however not been explored up to now except for $SrTiO_3$ (3.2 eV band-gap) doped La, N, F, Cr or Ta that exhibits some weak photocatalytic property due to a limited red shift of energy band for absorbing part visible light (Yamasita et al., 2004, supra).

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The present invention provides a method of providing photocatalytic activity. The photocatalytic activity allows or facilitates one or more light induced redox processes to occur. It may be employed for any desired purpose. The photocatalytic activity is typically capable, in the presence of light, oxygen and water, of oxidizing matter such as pollutants that are in contact, or come into contact, with the nanoparticulate matter that is provided in the method of the invention. The term "light" is understood to include electromagnetic radiation of any wavelength, including a distinct wavelength, a set of distinct wavelengths or any region of the electromagnetic spectrum.

Illustrative examples of pollutants are organic compounds such as aromatic polycondensates, aldehydes, benzene, black carbon, e.g. comparable to PM 10, and inorganic compounds such as nitrogen ($NO_x$) and sulfur ($SO_x$) oxides and carbon monoxide (CO). A randomly selected illustrative example of a pollutant that may be oxidized is a herbicide such as atrazine. Three further illustrative examples of corresponding photocatalytic activity are the production of $H_2$ and $O_2$ through the photocatalytic decomposition of water ("water splitting") using solar energy (for an introduction see e.g. Kudo, A., *Pure and Applied Chemistry* (2007) 79, 11, 1917-1927), the decomposition of the pollutant $NO_x$ into $N_2$ and $O_2$ and water purification.

For the purposes of water purification, in order to overcome electric repulsion between matter of the same surface charge, an additional material having an isoelectric point different from that of the nanoparticulate matter acting as the photocatalyst (see below) may be used in combination therewith, e.g. deposited on the surface of the photocatalyst particle or on the same surface as the nanoparticulate matter. In some embodiments of a method according to the present invention the photocatalytic activity allows the prevention of occurrence, prevention or inhibition of growth and/ or the destruction of a microorganism such as a bacteria, of a virus, of a fungus, of a mold, an algae, an odor, a flavour, as well as an organic compound, including a volatile organic compound (VOC), a drug, a carbohydrate, a lipid, a peptide; a nucleotide, an oligonucleotide, an oligopeptide, a polymer—including e.g. a protein, a polysaccharide or a nucleic acid molecule—a drug molecule, a drug metabolite, a vitamin, a pollutant, a stain and/or an inorganic compound or a metal ion. In some embodiments the photocatalytic activity allows maintaining a surface in a clean state. As an illustrative example, critical external optical spacecraft surfaces may be prevented from contamination with polymerized hydrocarbon films using the method of the invention, for instance by means of a coating that includes the nanoparticulate matter described below. As a further illustrative example, the photocatalytic activity may be employed for surface patterning, for example in preparing a pattern of discriminative wettability on the surface of a substrate as described in international patent application WO 2008/063134.

The photocatalytic activity in a method according to the present invention is based on the use of nanoparticulate material. Accordingly, the nanoparticulate matter used in the method of the invention is generally effective as a photocatalyst. The nanoparticulate matter used in the method of the invention is strontium titanate ferrite (also termed strontium titanium iron oxide) of the general formula STFx ($SrTi_{1-x}Fe_xO_{3-\delta}$). The variable x may be any value selected in the range from 0 to 1, including any value larger than 0 and maximally 1 or larger than 0 and smaller than 1, e.g. a value selected in the range from 0 to about 0.95, the range 0<x≤0.95, the range from 0 to about 0.9, the range 0<x≤0.9, the range from 0 to about 0.85, the range 0<x≤0.85, the range from 0 to about 0.8, the range 0<x≤0.8, the range from 0 to about 0.75 or the range 0<x≤0.75. The index δ, sometimes the index y, is commonly used in the art to indicate a defect structure with oxygen vacancies. In an attempt to define δ, Brixner et al. (Brixner, L. H., et al., *Mat. Res. Bull.* (1968) 3, 299-308) suggested that where the strontium titanate ferrite is of perovskite structure, it could also be taken to be represented by the formula $SrTi_{1-x}Fe_xO_{(3-x)/2}\emptyset_{x/2}$ where Ø indicates vacancies in the oxygen sites. In this illustrative formula, a lattice of $SrTi_{1-x}Fe_xO_{(3-x)/2}$ may be taken to represent the framework, in which the only partially filled oxygen sublattice is present (cf. also Rothschild, A., et al., *Chem. Mater* (2006) 18, 3651-3659). Rothschild et al. (ibid.) suggested δ in formula $SrTi_{1-x}Fe_xO_{3-\delta}$ to be taken to represent an anion Frenkel disorder and showed that with different oxygen partial pressures and temperatures a change in mass occurs. STFx used in the method of the invention is generally of the Perovskite structure. It is typically nontoxic, clean, and safe and of significant thermal stability.

The nanoparticulate matter may be formed according to any known technique available in the art, including any liquid or solid synthesis method, such as the sol-gel method, high-energy ball milling (see also the examples below), a solid-state reaction (e.g. high temperature solid-state reaction) (e.g. analogous to Lotnyk, A., et al., *Solid State Sciences* (2008) 10, 6, 702-708; see also Brixner, L. H., et al., 1968, supra), a hydrothermal reaction (see Bae, S. W., et al., *Applied Physics Letters* (2008) 92, 104107, or e.g. analogous to Ke, D., et al., *Materials Letters* (2008) 62, 3, 447-450; for a non-aqueous system cf. Buonsanti, R., et al., *J. Am. Chem. Soc.* (2008), 130, 33, 11223-11233), chemical vapor deposition (CVD), physical vapor deposition (PVD), molecular beam epitaxy (MBE) (e.g. analogous to Cheung, S. H., et al., *Surface Science* (2007) 601, 7, 1754-1762 or Osterwalder, J., et al., *Thin Solid Films* (2005) 484, 1-2, 289-298), chemical co-precipitation, RF magnetron sputtering, thermal or flame hydrolysis, ionized cluster beam (ICB) deposition (e.g. analogous to Zhou, J. K., et al., *Catalysis Letters* (2006) 106, 1-2, 67-70), reactive pulsed laser deposition (Xu, Y, & Shen, M., *Journal of Materials Processing Technology* (2008) 202, 301-306), via a direct current field (Okumara, Y., et al., *J. Mater Res.* (2008) 23, 1, 127-132) and any synthesis or deposition technique and method etc. As an example, CVD is a method of thin film deposition, in which gaseous elements are chemically reacted onto a substrate such as a wafer to form a stable solid thin film. Low pressure CVD is a method of thin film deposition in a vacuum. The deposition speed can be increased by forming a vacuum inside a chamber, in which the thin film is deposited, and the density of a by-product, which can be generated by the presence of air, can be lowered. PVD is a method that is used in thin film formation. PVD has recently been favored as a means of surface curing, since a thin film can be more simply obtained by low temperature treatment that cannot be performed using other methods. Examples of PVD methods include an evaporation deposition method that does not use ions, a sputtering method that uses ions, an ion plating method, an ion implantation method, an ion beam mixing method and the like. Metal is evaporated when heated in a vacuum, and this principle is applied in the evaporation deposition method.

In a sol-gel method, two or more separate sols, which are then combined. One of these sols may include strontium oxide, while another one may include titanium oxide, yet a further one may include iron oxide. In this regard, any suitable protocol may be used, for example analogous to those used by Somani & Kalita (*J. Electroceram.* (2007) 18, 57-65) or by Brito et al. (*Physica B* (2006) 384, 91-93). An overview on the formation of amorphous porous mixed oxides via the sol-gel method has for example been given by Frenzer & Maier (*Annu. Rev. Mater. Res.* (2006) 36, 281-331). One or more of the strontium oxide, the titanium oxide, the iron oxide or all oxides used may be formed from a precursor, for example in situ during the reaction process. Where separate sols are combined one sol may be a strontium oxide sol, i.e. a suspension of colloidal strontium oxide based particles, typically nanoparticles. This sol may for instance be generated by hydrolysis of a precursor such as titanium alkoxide. The hydrolysis of a metal alkoxide or metal halide is thought to induce the substitution of —OR or halogen groups linked to the metal by metal-OH groups, which then lead to the formation of a metal oxide network via condensation polymerisation. Typically, but not limited thereto, sol preparation by hydrolysis of a metal alkoxide can be performed in an alcohol such as ethanol or isopropanol, water or a mixture thereof. Typically the use of water is avoided where the metal alkoxide or halide is reactive/sensitive to moisture. Any known catalyst such as hydrochloric acid or ammonia may be added as well.

Suitable sol-gel protocols use for instance acid-catalyzed, base-catalyzed and two-step acid-base catalyzed procedures. Upon combining the sols in a second step a sol is obtained that contains several metal oxides, e.g. strontium oxide, titanium oxide, and iron oxide. Upon varying the ratio of each sol used for mixing, a desired molar ratio of $SrO_2$ to $TiO_2$ and $FeO_2$ can be generated. Where a one-step method is used to form a sol that includes strontium oxide, titanium oxide, and iron oxide, the respective ratio is accordingly determined by the amounts of the individual oxide-compounds applied. The sol subsequently undergoes a catalysed transition to form a gel. In some embodiments forming a gel from a sol includes contacting the sol with a substrate. Contacting the sol with a substrate may for instance include depositing the sol onto a substrate.

In one embodiment the nanoparticulate matter is formed by precipitation in a sol process from any suitable precursors such as $Sr(NO_3)_2$, $Fe(NO_3)_3$ and a titanium alkoxide. The formation of a nanoscaled powder using this technique has for example been described by Sahner et al (*Sensors* (2007) 7 1871-1886). In another embodiment the nanoparticulate STFx is formed in a ball-milling process. An illustrative example of a ball-milling process in the formation of $SrTi_{1-x}FeO_{3-\delta}$ from $SrO_2$, Ti, $TiO_2$ and Fe has been disclosed by Neri et al. (*Sensors and Actuators B* (2007) 126, 258-265).

The nanoparticulate matter used in the method of the invention may be provided in any desired form, such as a suspension, an aerosol or a powder, including a nano powder, which may also include a mixture of solid matter (whether amorphous or crystalline). In some embodiments the nanoparticulate matter is a component of a composition, e.g. with one or more metals or metal oxides, such as nanoparticulate matter. The nanoparticulate matter may also be provided as a film, a paste, a coating, or an additive in other matter. In some embodiments the nanoparticulate matter is included in a coating, which may be any form of coating capable of accommodating the nanoparticulate matter. A respective coating may for example be included in or on, or be applied to any desired solid. Accordingly, in some embodiments the nanoparticulate matter resides on a support, such as a base, which may include or consist of ceramic, metallic, or polymeric materials or composites thereof as long as they are capable of withstanding the conditions, e.g. temperatures, selected for depositing or otherwise applying the nanoparticulate matter. Illustrative examples of solid matter to which the nanoparticulate matter may be applied include building materials including roofing materials, concrete and cement based materials, plasters, asphalts, ceramics, stucco, grout, plastics, metals or coated metals, glass, or combinations thereof, inner surfaces of pipes or pipelines, pool surfaces, wall coverings, siding materials, flooring, filtration systems, cooling towers, buoys, seawalls, retaining walls, boat hulls, docks, or canals. In some embodiments the nanoparticulate matter may be applied to the surface of fibers or fabrics. The photocatalytic activity may then be used to initiate or facilitate a reaction with air that kills most viral and bacterial microbes. Clothes and other textiles may thus be provided with self cleaning properties resembling those of the lotus plant, not only when combined with ultrahydrophobic surface characteristics, which possess intrinsic self-cleaning properties.

Nanoparticulate matter according to the present invention may also be used for detoxifying purposes. The use of nanoparticulate matter according to the method of the invention allows for examples the manufacture of materials and devices for the decontamination of surfaces that may for instance be contaminated with toxic agents, including chemical warfare and biological warfare agents. Such agents may be oxidized into a form that is either less toxic, or nontoxic, to the functioning of biological life, particularly human and animal life. The respective nanoparticulate matter may for example be included in a nano-sized or micro-sized fiber as described in international patent application WO 2008/127200.

As already mentioned above, an illustrative example of applying the nanoparticulate matter onto a surface is sputtering. Sputtering is based on that upon the collision of a particle with high energy with target matter, atoms or molecules are ejected from the respective target matter. In an exemplary embodiment he target matter and a substrate are provided to define an anode and a cathode, respectively. A high pressure of about $10^{-2}$ Torr is applied between the anode and cathode under an argon atmosphere. As a result, argon gas around the anode is ionized to $Ar^+$. The $Ar^+$ is directed to and collides with the anode. Molecules or atoms of the target matter are ejected from the anode by the $Ar^+$ ion bombardment and are bound to the substrate, thereby forming a thin film on the cathode. Examples of sputtering include DC sputtering, RF sputtering, bias sputtering, magnetron sputtering and the like, and in particular, magnetron sputtering is a high speed sputtering method and favoured in various fields.

Particle sizes of the nanoparticulate matter may be selected any where in or below the nano-range. In this regard the nano-range is taken to cover particle widths from about 1 to about 1000 nm. The term "nanoparticulate" is understood to include sub-nanometer dimensions, such as widths in the range from about 0.1 to about 1 nm and below. Generally, the nano-particulate matter has particle sizes in the range from about 2 nm to about 750 nm, such as from about 2.5 nm to about 500 nm, about 5 nm to about 400 nm, about 1 to about 400 nm, about 2 nm to about 300 nm, about 5 to about 200 nm or about 1 to about 200 nm. Within a selected range particles within the nanoparticulate matter may be of any desired size distribution. In some embodiments the nanoparticulate matter is impregnated or doped with other matter such as metal atoms or ions, e.g. a member of one of groups 1-12 of the periodic table of elements (e.g. a member of group 1, of group 2, of group 3, of group 4, of group 5, of group 6, of group 7, of group 8, of group 9, of group 10, of group 11 or of group 12), metalloid atoms such as boron, silicon or germanium, or non metal atoms, e.g. phosphor, sulphur, selenium, iodine, bromine, or chlorine. Where the corresponding dopant is a member of group 3 of the periodic table of elements, it may for example be one of Sc, Y, an actinoid or one of the lanthanoids Ce, Pr, Nd, Sm, Eu, Gd, Tb, Dy, Ho, Er, Tm, Yb or Lu. Where the corresponding dopant is a member of group 5 of the periodic table of elements, it may for example be V or Nb. Where the corresponding dopant is a member of group 6 of the periodic table of elements, it may for example be Mo or W.

If desired, the nanocomposite matter may include any other a stabilizer, which may be or include any suitable element or compound. In some embodiments the nanoparticulate matter is free of a dopant, stabilizer and/or impregnation. While a dopant such as a metal, e.g. a noble metal, may be used in the method of the invention, for example for tailoring or tuning the wavelength range in which the photocatalytic activity occurs (cf. below), those skilled in the art will appreciate that the methods and uses according to the present invention do not require any dopant in order to efficiently use the visible range of the electromagnetic spectrum to obtain photocatalytic activity. Thus, the term "free of dopant" as used herein means that in such embodiments a strontium titanate ferrite of the general formula $SrTi_{1-x}Fe_xO_{3-\delta}$, is used that does not include any other chemical element of one of groups 1-12 of the periodic table of elements (e.g. a member of group 1, of group 2, of group 3, of group 4, of group 5, of group 6, of group 7, of group 8, of group 9, of group 10, of group 11 or of group 12), metalloid atoms such as boron, silicon or germanium, or non metal atoms, e.g. phosphor, sulphur, selenium, iodine, bromine, or chlorine.

The photocatalytic activity in a method according to the present invention is effected by exposing the nanoparticulate matter to electromagnetic radiation. The electro-magnetic radiation is of one or more wavelengths in the range from about 380 nm to about 800 nm, including from about 400 nm to about 800 nm, from about 400 nm to about 750 nm, from about 400 nm to about 700 nm or from about 400 nm to about 600 nm. In some embodiments the nanoparticulate matter can absorb irradiation over at least essentially the whole visible light range. In some embodiments the nanoparticulate matter can absorb irradiation of a defined wavelength, or a number of certain wavelengths, or irradiation within a certain range of the electromagnetic spectrum, including a certain portion of the visible light range.

A nano-structured metal oxide semiconducting composite of the STFx series can for instance be employed for photocatalytic-based anti-bacterial activity under the whole visible light range for both indoor and outdoor applications. In an example depicted in FIG. 2, the synthesized materials can not only absorb 43% of sunlight in outdoor environments, but also the normal light under artificial light (e.g. fluorescent bulbs). According to the present invention matter that is of or includes the STFx ($SrTi_{1-x}Fe_xO_{3-\delta}$) (x=0 to 1) material series can accordingly be used as a high efficiency visible-light-driven (VLD) photo-catalyst. Photocatalytic activity according to the invention does not require UV light for electron-hole pair formation and hence are safe, clean, convenient and economical for a wide range of applications in common places such as hospital, offices, canteens, homes and toilets.

Figure 5:
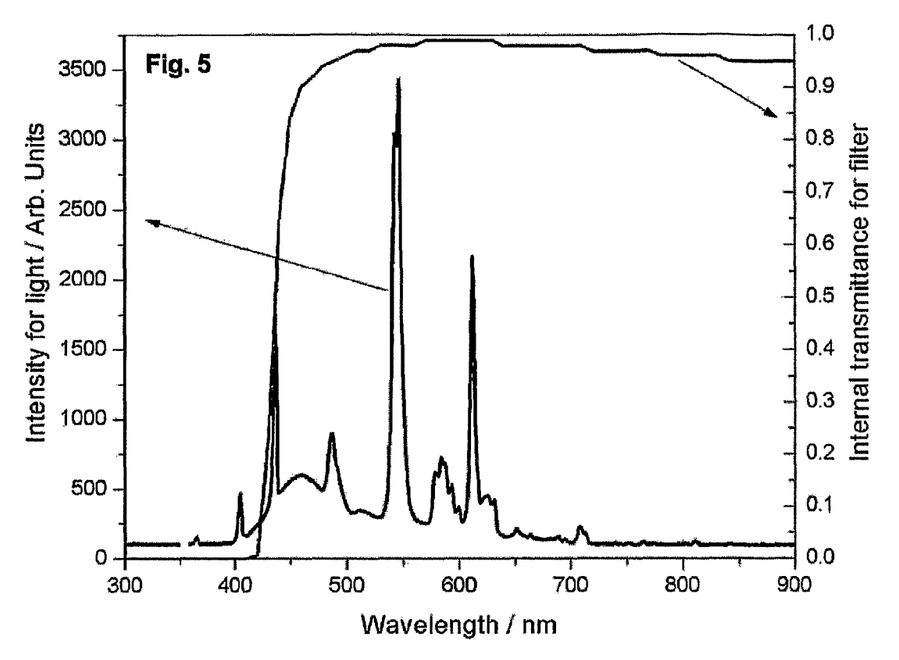
FIG. 5 shows the light spectrum of the office fluorescent light (40 W) and internal transmittance for light-filter GG435.

Photocatalytic activity according to the method of the invention is in typical embodiments effective even under low light irradiation of the normal office 40 watt fluorescent tube (the spectrum is show in FIG. 5). For materials so far used in the art low wattage bulbs are insufficient for activation of the photocatalytic process. The conventional visible source or solar light in photocatalytic application is normally about 300-500 watt. In contrast thereto, STFx ($SrTi_{1-x}Fe_xO_{3-\delta}$) (x=0 to 1) is already responsive to a 40 watt fluorescent tube.

The conventional STFx ($SrTi_{1-x}Fe_xO_{3-\delta}$) (x=0 to 1) series have so far been mainly applied in gas sensors (oxygen, hydrocarbon, $C_2H_5OH$) (Moos, R., et al., *Sensors and Actuators B* (2000) 67, 178-183; Sahner, K., et al., *Sensors and Actuators B* (2005) 108, 102-112; Wang, Y., et al., *Materials Letters* (2001) 49, 361-364), humidity sensors (Costa, M. E. V., et al., *Journal of the European Ceramic Society* (1999) 19, 769-772), and hydrogen ion conduction (Steinsvik, S., et al., *Solid State Ionics* (2001) 143, 103-116). $SrTiO_3$ is also a proposed candidate for the dielectrics of dynamic random access memory (DRAM) (Fukuda, Y., *Jpn. J. Appl. Phys.* (1995) 34, L1291-L1292). For the photocatalytic application under visible irradiation, STFx ($SrTi_{1-x}Fe_xO_{3-\delta}$) (x=0 to 1) has however not been explored up to now except for $SrTiO_3$ (3.2 eV band-gap) doped La, N, F, Cr or Ta that exhibits some weak photocatalytic property due to a limited red shift of energy band for absorbing part visible light (Wang, J., et al., *Journal of the European Ceramic Society* (2005) 25, 3207-3212).

The synthesized composite of STFx ($SrTi_{1-x}Fe_xO_{3-\delta}$) (x=0 to 1) has typically strong photocatalytic and anti-bacterial properties over the entire visible light range (wavelength range from 400-700 nm) due to their absorbing almost the whole light spectrum in the visible range.

Without the intent of being bound by theory the nanoparticulate matter used in the method of the invention may be of any bandgap as long as it includes STFx. The bandgap may at room temperature for instance be in the range from about 3.0 to about 1 eV, such as about 3.0 to about 1.5 eV, about 3.0 to about 1.7 eV or about 3.0 to about 2.0 eV. The inventors have observed that synthesized nano-structured STFx ($SrTi_{1-x}Fe_xO_{3-\delta}$) (x=0 to 1) series typically have bandgaps from about 2.66 to about 1.8 eV. Exemplary nano-sized (27 nm) STFx material is showed in FIG. 9. These materials cover almost the entire visible light range (see FIG. 10) and extend the absorption from the conventional ultraviolet light (UV) ($\lambda$<388 nm) to the entire visible-light (about 400 about 700 nm) irradiation. The wavelength distribution of the irradiation source determines the optimal composition of STFx (x=0 to 1). It can provide highly efficient utilization of indoor and outdoor light spectra.

Application of STFx ($SrTi_{1-x}Fe_xO_{3-\delta}$) (x=0 to 1) material series as photocatalysts in anti-bacterial applications is first explored under strictly visible light irradiation. This material series is excellent for applications in chemical and biological decompositions or degradations under both natural and artificial lighting.

The use of matter that includes or consists of STFx ($SrTi_{1-x}Fe_xO_{3-\delta}$) x=0 to 1) has the ability to harness both artificial light and the visible-light portion of solar light with high efficiency for useful photo-catalytic applications. The use is also of benefit in terms of environmental protection (air deodorization, air purification, anti-fogging materials, water treatment, anti-bacterial materials, self-cleaning materials, and biomedical materials) and energy saving (directly utilizing nature light indoor or out door). This material series has the potential to replace conventional commercial $TiO_2$ usage in all existing photocatalytic applications such as air-cleansing, water treatment, self-cleaning materials and anti-organism materials (bacteria, fungi, yeasts and viruses). An illustrative example of a filterless air purification system, in which the photocatalytic activity according to the present invention may be used, has for instance been disclosed in U.S. patent application 2007/181508.

As noted above, in typical embodiments the method of the invention may be applied to a redox process, whether e.g. indoor or outdoor. Of this process the oxidation process may be of particular interest. The oxidation process may involve the formation of highly reactive species such as hydroxyl radicals. As noted above, an oxidation process may advantageously be applied to the removal of germs, oil, algae spores, mildew, bacteriae, mold, allergens, stain, air and/or water pollutants, odor such as food odor, pet odor or smoke odor as well as water treatment. It may for instance be use in the manufacture of an air purifier, e.g. an air cleaner, air freshner, odor eliminator, car air purifier, indoor air purifier, anti-bacterial material (fungi, yeasts, bacteria and viruses) or anti-fogging material. It may also be used for photocatalysed sterilization purposes. Nanoparticulate STFx as used according to the invention may also be used in the manufacture of a coating that has photocatalytic properties. It may also be included into other matter to provide photocatalytic properties, for instance in a biomedical material including a medical polymer. A respective coating may for example be used to prevent bacterial colonization of a corresponding substrate. It may for instance serve in providing a bactericidal effect to implants (see Yoshinobu, O, et al., *Journal of Biomedical Materials Research Part B: Applied Biomaterials* (2008) 2, 530-540), in particular percutaneous implants, and other matter intended for use in the human or animal body. In some embodiments a respective surface may be used for photocatalytic lithography purposes. By using the sol-gel method in forming strontium titanate ferrite in combination with exfoliated graphite oxide a composite material of carbon nanosheets with strontium titanate ferrite nanoparticles can be obtained that has photocatalytic activity (cf. also Liu, Y. -J., *Materials Letters* (2009) 63, 2, 260-262). Graphite oxide may be synthesized from natural graphite and mixed with a strontium titanate ferrite sol (analogous to Liu et al., 2009, ibid.).

A respective coating or other matter may for instance have or provide self cleaning properties once exposed to visual light, whether sunlight or artificial light, indoor or outdoor. An illustrative example of a photocatalytic coating in which photocatalytic activity according to the present invention may be used has been described in international patent application WO 2008/079865.

The nanoparticulate matter used in the present invention can potentially be coated to surfaces in environments requiring degradation of organic compounds of microorganisms. For example, the material may be applied to building walls, glass-tops, textiles, household items and toilet tiles to prevent bacteria growth. It is equally applicable to indoor environments as it is to outdoor environments and when applied to these surfaces can help deodorize and clean the air (e.g. car exhaust, cigarette smoke, volatile organic compounds etc) inside these spaces as well as prevent bacterial growth and scum build-up keeping these environments clean. The materials can even be used at roadside locations such as under- and over-passes where normal lighting fixtures will provide sufficient excitation. They can be used to protect lamp-houses and walls in tunneling, as well as to prevent white tents from becoming sooty and dark. Furthermore, this material in thin film forms is also able to exhibit a super-hydrophilic property under visible irradiation. This function will be applicable to anti-fogging features for mirrors and glass surfaces for bathroom room features, vehicles, office windows etc. Visible-light photo-catalysts for anti-bacterial application are of great potential and in an area that is of worldwide importance.

This nanoparticulate matter can be mass produced easily and in an inexpensive manner using conventional nanotechnology such as the industrial ball milling, flame-hydrolysis, or chemical synthesis systems. For an illustrative example on ball milling see e.g. Arentzen, C. & Bhappu, R., *Engineering and Mining Journal* (2008), 209, 3, 62-68.

In order that the invention may be readily understood and put into practical effect, particular embodiments will now be described by way of the following non-limiting examples.

EXAMPLES

Figure 3:
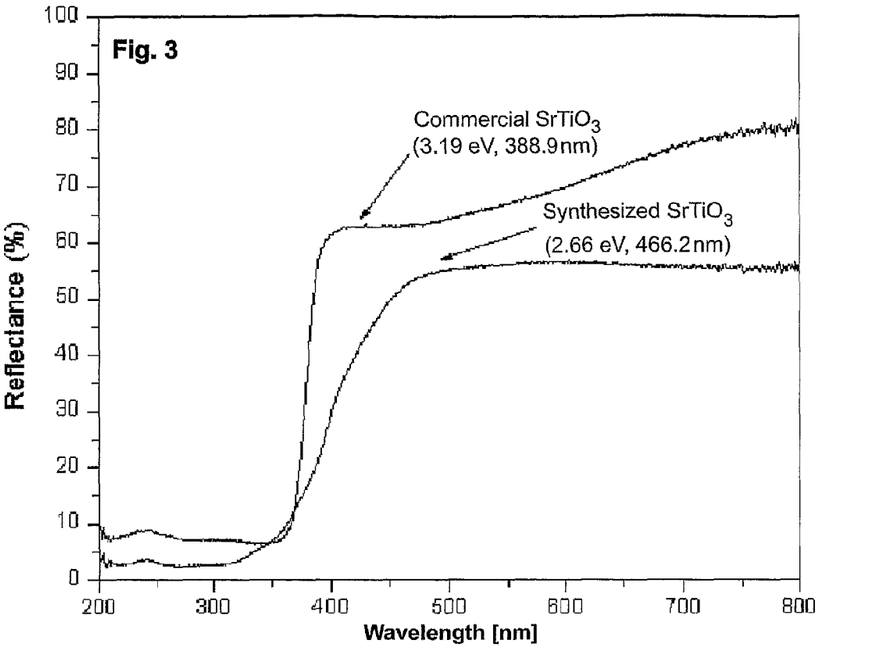
FIG. 3 depicts diffuse reflectance spectra of commercial materials and nanoparticulate matter, STFx (x=0), used in the method of the invention.
Figure 4:
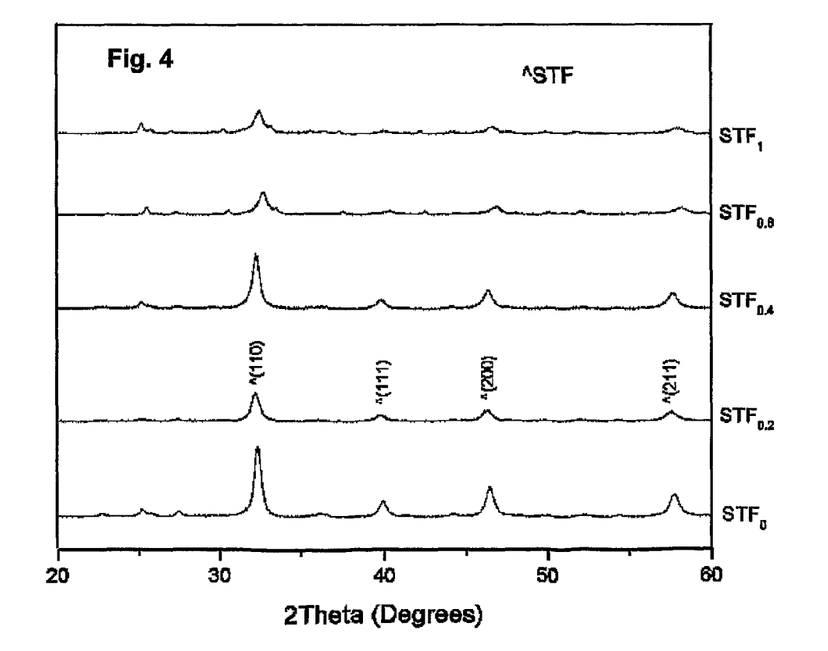
FIG. 4 depicts XRD patterns of the synthesized STFx samples with x ranging from 0 to 1.
Figure 9A:
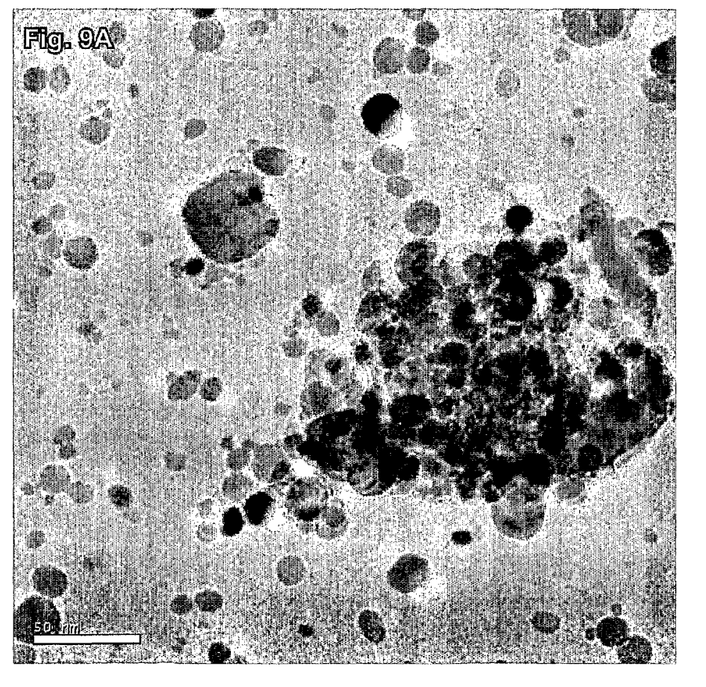
FIG. 9 shows transmission electron microscope (TEM) bright-field (FIG. 9*a*) and selected-area diffraction (SAD) patterns (FIG. 9*b*) of synthesized STFx nano-composite matter (x=0.4).
Figure 9B:
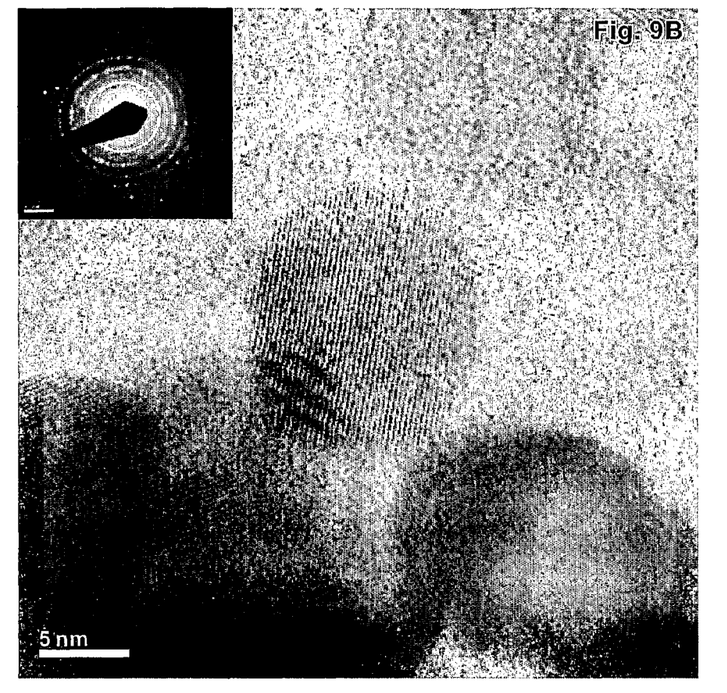
Figure 10:
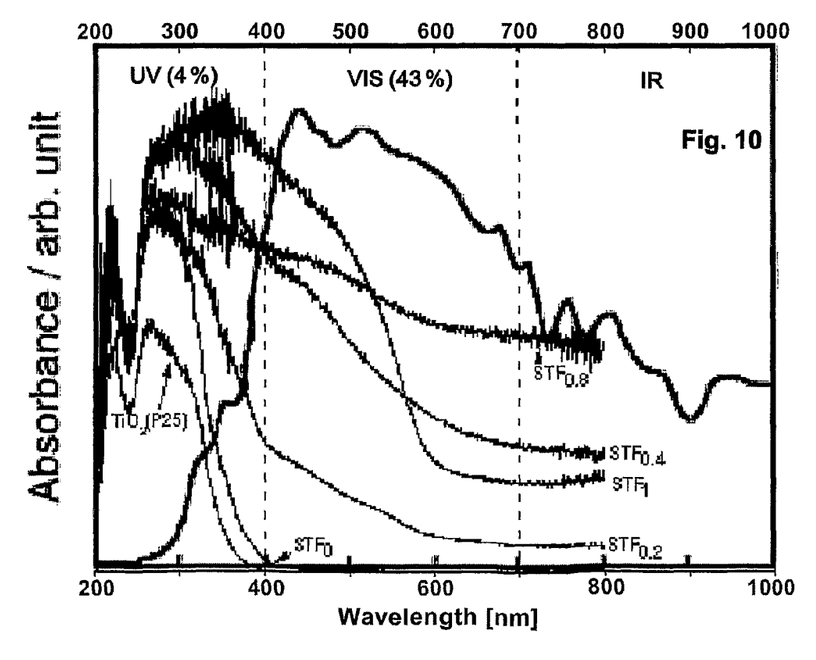
FIG. 10 shows the diffused reflectance UV-VIS absorption spectra of STFx and pure $TiO_2$ (P25).

Material and Methods $SrTi_{1-x}Fe_xO_{3-\delta}$ (with x=0-1) material can be obtained by a variety of techniques, such as high temperature solid reaction (Brixner, L. H., et al., 1968, supra) or sol-gel (liquid) (Steinsvik, S., et al., *Solid State Ionics* (2001) 143, 103-116) etc. The high-energy ball milling technique is also an effective method to synthesize nanosized materials with solid-state reaction at room temperature. The nano-structured $SrTi_{1-x}Fe_xO_{3-\delta}$ (with x=0-1) material series were synthesized by high-energy ball milling technique in this experiment. Nanoparticulate strontium titanate ferrite of various values of x from 0 to 1 was analysed and exemplary results are shown. The synthesis and mixing process used correspond to the method previously described (Hu, Y., et al., *IEEE Sensors Journal* (2005) 5, 5, 825-832). In addition to the starting materials of strontium oxide (SrO, 99.9% purity, density 4.700 g/cm-3, Aldrich Chemical), and titanium (IV) oxide ($TiO_2$, 99+% purity, rutile, Johnson Matthey), hematite iron ($\alpha$-$Fe_2O_3$, 99.9% purity particle size<5 μm) was employed using the planetary ball mill (Fritsch Pulverisette 5) at room temperature. The detailed processes are as follows: An open container with tungsten carbide (93 wt % WC and 6 wt % Co) vials and balls were chosen. The vial had a volume of 250 ml with an inner diameter of 75 mm and the balls were of a diameter of 10 mm and 20 mm. The ball-to-power weight ratio was 20:1. As an example, the starting materials ratio for STF0.4 (x=0.4) used were 22.41 g, 10.36 g, 6.91 g for SrO, $TiO_2$ and $Fe_2O_3$ respectively. The milling speed and time were set at 200 rpm and 120 hours respectively. The synthesized nano-structured $SrTi_{1-x}Fe_xO_{3-\delta}$ (with x=0-1) material series for band gap between 2.66 eV (Zhang, W. F., et al., *Modern Physics B* (2000) 14, 19, 709-716) (nano-sized $SrTiO_{3-\delta}$, the bandgap measurements (shown in FIG. 3) and calculations were carried out according to Shu et al., 2003, supra.) and 1.8 eV (Rothschild et al., 2006, supra) ($SrFeO_{3-\delta}$) that correspond to x=0 to 1 respectively. X-ray powder diffractometry of STFx with x ranging from 0 to 1 is shown in FIG. 4. As an exemplary size of synthesized nanoparticles with x=0.4, depicted in FIGS. 9a and 9b, a width was about 27 nm. The synthesized materials can absorb a large part of the visible light spectrum (470-690 nm, relative to materials bandgaps: 2.66-1.8 eV). Hence, the $SrTi_{1-x}Fe_xO_{3-\delta}$ can serve as visible-light-driven photocatalysts that can achieve high efficiency true visible-light-driven photocatalytic properties.

Figure 6:
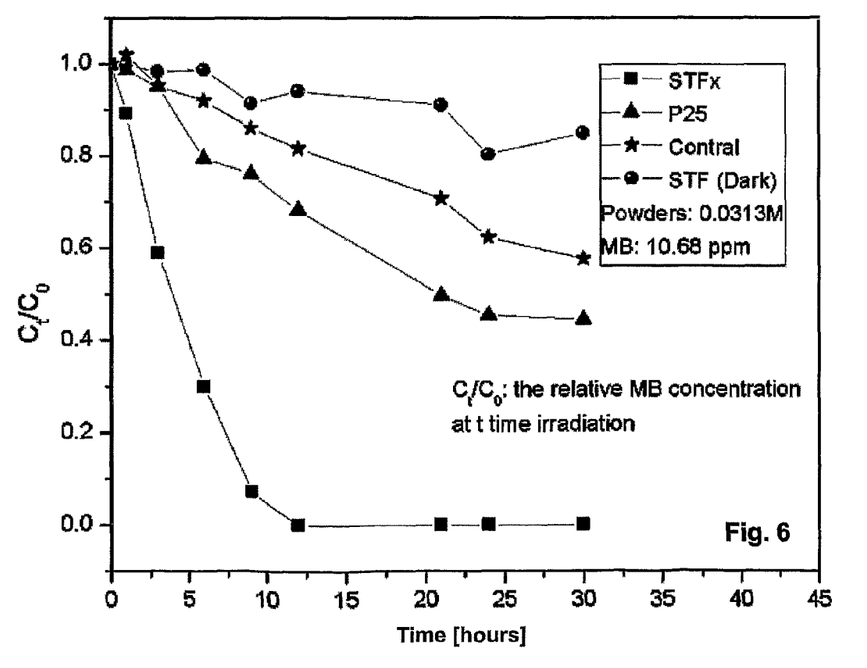
FIG. 6 depicts the photocatalytic degradation of Methylene Blue (MB) for STFx (x=0.9) under 40 watts office fluorescent light irradiation with light-filter GG435.

Among the various dyes, methylene blue (MB) is known to be very difficult to degrade under visible light and is often used as a model dye contaminant to evaluate the activity of a photocatalyst. The photocatalytic degradation of MB (10.68 ppm) for STFx materials is conducted under a 40 W fluorescent light irradiation with light-filter GG435 (FIG. 5). This filter serves to cut off the light wavelength below 410 nm, that is, the UV light part of the light source is strictly excluded. FIG. 6 shows the $C_t/C_0$ vs. irradiation time plot (at 664 nm) for STFx with x=0.9 (concentration 0.0313 M), STFx (concentration 0.0313M, Dark, i.e. in the absence of a light source), P25 (concentration 0.0313M, a commercially available $TiO_2$) and Control (only pure MB (10.68 ppm)) samples irradiated under 40 W fluorescent light with the light-filter. The commercially available $TiO_2$ P25 is used as reference for comparison as it is a widely used photocalyst that demonstrates a strong photocatalytic property under UV irradiation. $C_0$ and $C_t$ denote the concentration of the UV-absorption spectra for the materials at the initial and the different irradiation time respectively. The complete photocatalytic degradation of MB for the STFx material is around 12 hours while P25 basically cannot degrade MB under the same conditions of irradiation. It is evident that STFx material degrades MB under strictly visible light irradiation. In addition, STFx has also been observed not to degrade MB in dark condition. This confirms that the STFx material degrades MB purely through the photocatalytic reactions.

Figure 7:
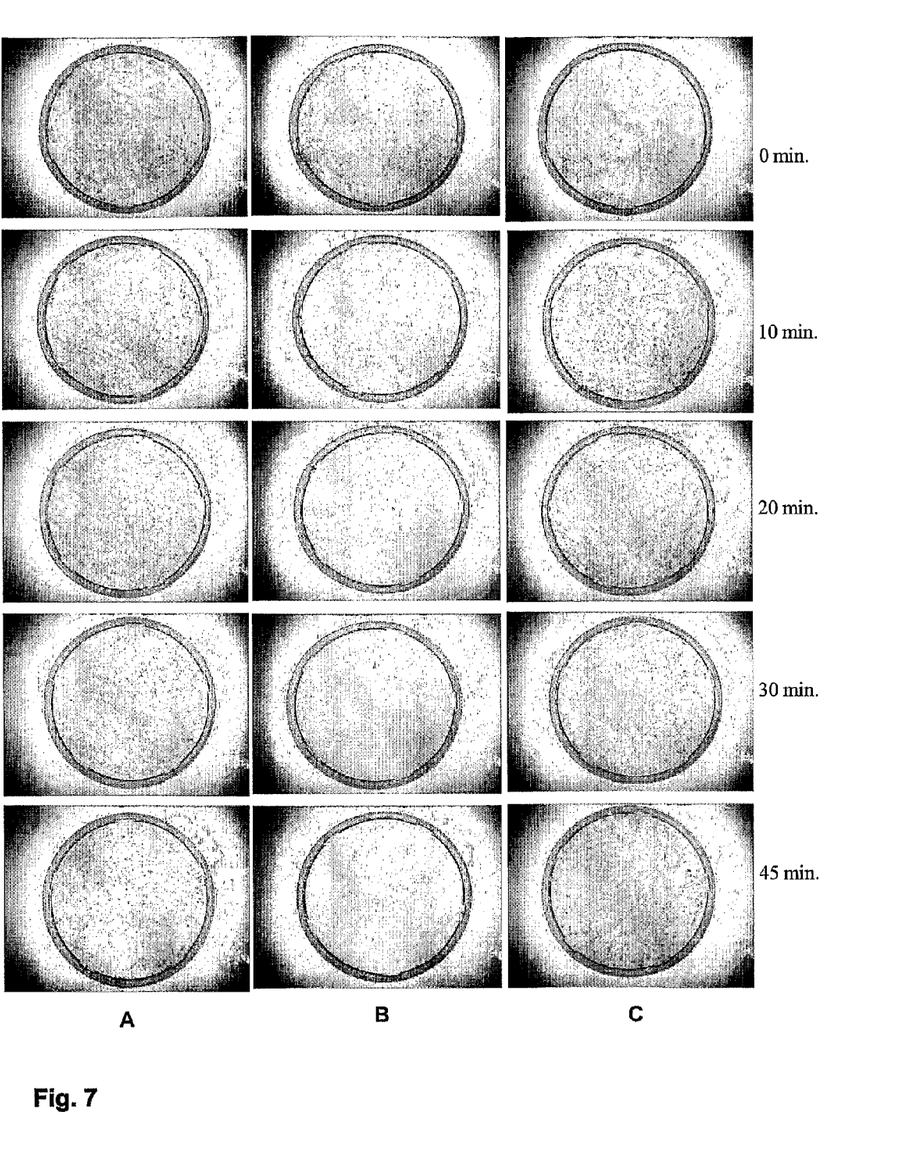
FIG. 7 depicts the anti-bacterial effects for (a) P25, (b) STFx powders (x=0.4), and (c) a control experiment under fluorescent light at 0, 10, 20, 30, 45 minutes respectively
Figure 8:
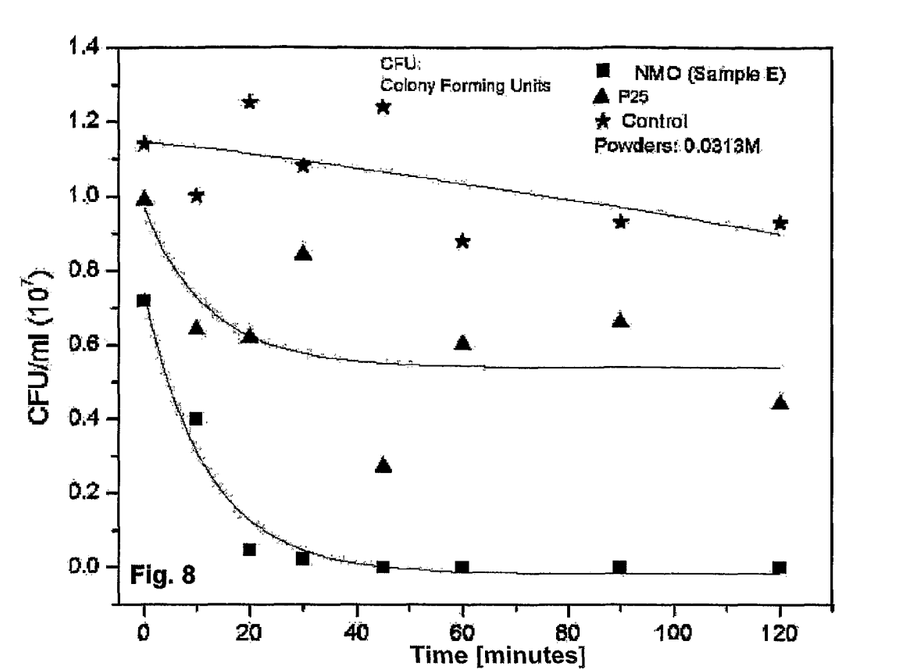
FIG. 8 depicts anti-bacterial effects for STFx powders (x=0.4), P25 and Control under 40 watts fluorescent light at 0, 10, 20, 30, 45 minutes respectively.

Similarly, definitive results were obtained for the inactivation of *E. coli* bacteria for the STFx series. The anti-bacterial experiments were conducted with STFx (concentration 0.0313M), P25 (concentration 0.0313M), and Control (only pure *E. coli* in distilled water) under fluorescent light with the same beginning *E. coli* (strain: Top 10) concentration. FIG. 7 shows the photographs illustrating the anti-bacterial effects for these three materials under fluorescent light 0, 10, 20, 30, 45 minutes respectively. The details of CFU (Colony Forming Unit) of STFx (0.0313M), P25 (0.0313M) and Control with different time under 40 W fluorescent light irradiation are plotted in FIG. 8. The efficiency for STFx is the best in all the samples. It demonstrates the inactivation of bacteria within 45 minutes while the commercially available $TiO_2$ (P25) cannot eliminate all the bacteria even after 2 hours. This is the first ever discovery and report on anti-bacterial effect for this semiconducting $STF_x$ material under visible light. The P25 material showed insignificant anti-bacterial effect under the 40 W fluorescent light irradiation.

The listing or discussion of a previously published document in this specification should not necessarily be taken as an acknowledgement that the document is part of the state of the art or is common general knowledge.

The invention illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:
1. A method of providing photocatalytic activity, the method comprising:
providing nanoparticulate matter comprising a strontium titanate ferrite of the general formula $SrTi_{1-x}Fe_xO_{3-\delta}$, wherein x is any value larger than 0 and maximally 1, and allowing exposure to electromagnetic radiation of a wavelength from about 380 nm to about 800 nm.

2. The method of claim 1, wherein the photocatalytic activity allows at least one of the prevention of occurrence and the destruction of at least one of a microorganism, a virus, a fungus, a mold, an algae, an odor, and a flavour.

3. The method of claim 2, wherein the photocatalytic activity is applied to one of maintaining a surface in a clean state, surface patterning, air purification, anti-fogging, water treatment and water splitting.

4. The method of claim 1, wherein the strontium titanate ferrite is of a Perovskite structure.

5. The method of claim 1, wherein the wavelength is from about 400 nm to about 700 nm.

6. The method of claim 1, wherein the wavelength is from about 400 nm to about 600 nm.

7. The method of claim 1, wherein the nanoparticulate matter is comprised in or arranged on a substrate.

8. The method of claim 7, wherein the nanoparticulate matter is comprised in a coating.

9. The method of claim 1, wherein the nanoparticulate matter is free of a dopant.

10. The method of claim 1, wherein the nanoparticulate matter is obtained by a process selected from the group consisting of a sol-gel process, high-energy ball milling, a high temperature solid-state reaction, a hydrothermal reaction, chemical vapor deposition, physical vapor deposition, molecular beam epitaxy, ionized cluster beam deposition, chemical co-precipitation, RF magnetron sputtering, thermal hydrolysis and flame hydrolysis.

11. A method of preventing occurrence of at least one of a microorganism, a virus, a fungus, a mold, an odor and an algae, the method comprising
providing nanoparticulate matter comprising a strontium titanate ferrite of the general formula $SrTi_{1-x}Fe_xO_{3-\delta}$, wherein x is any value larger than 0 and maximally 1,
and allowing exposure to electromagnetic radiation of a wavelength from about 380 nm to about 800 nm.

12. A method of destructing at least one of a microorganism, a virus, a fungus, a mold, an odor and an algae, the method comprising:
providing nanoparticulate matter comprising a strontium titanate ferrite of the Hgeneral formula $SrTi_{1-x}Fe_xO_{3-\delta}$, wherein x is any value larger than 0 and maximally 1,
and allowing exposure to electromagnetic radiation of a wavelength from about 380 nm to about 800 nm.

* * * * *

UNITED STATES PATENT AND TRADEMARK OFFICE
CERTIFICATE OF CORRECTION

PATENT NO.       : 8,679,403 B2
APPLICATION NO.  : 12/922668
DATED            : March 25, 2014
INVENTOR(S)      : Ooi Kiang Tan et al.

Page 1 of 1

It is certified that error appears in the above-identified patent and that said Letters Patent is hereby corrected as shown below:

In the Claims:

Column 14, line 19:
"titanate ferrite of the Hgeneral formula $SrTi_{1-x}Fe_xO_{3-\delta}$," should read, --titanate ferrite of the general formula $SrTi_{1-x}Fe_xO_{3-\delta}$,--.

Signed and Sealed this
Sixteenth Day of September, 2014

Michelle K. Lee
*Deputy Director of the United States Patent and Trademark Office*